Jan. 25, 1944.
C. C. WHITTAKER
2,340,094
CONTROL SYSTEM
Filed July 17, 1941
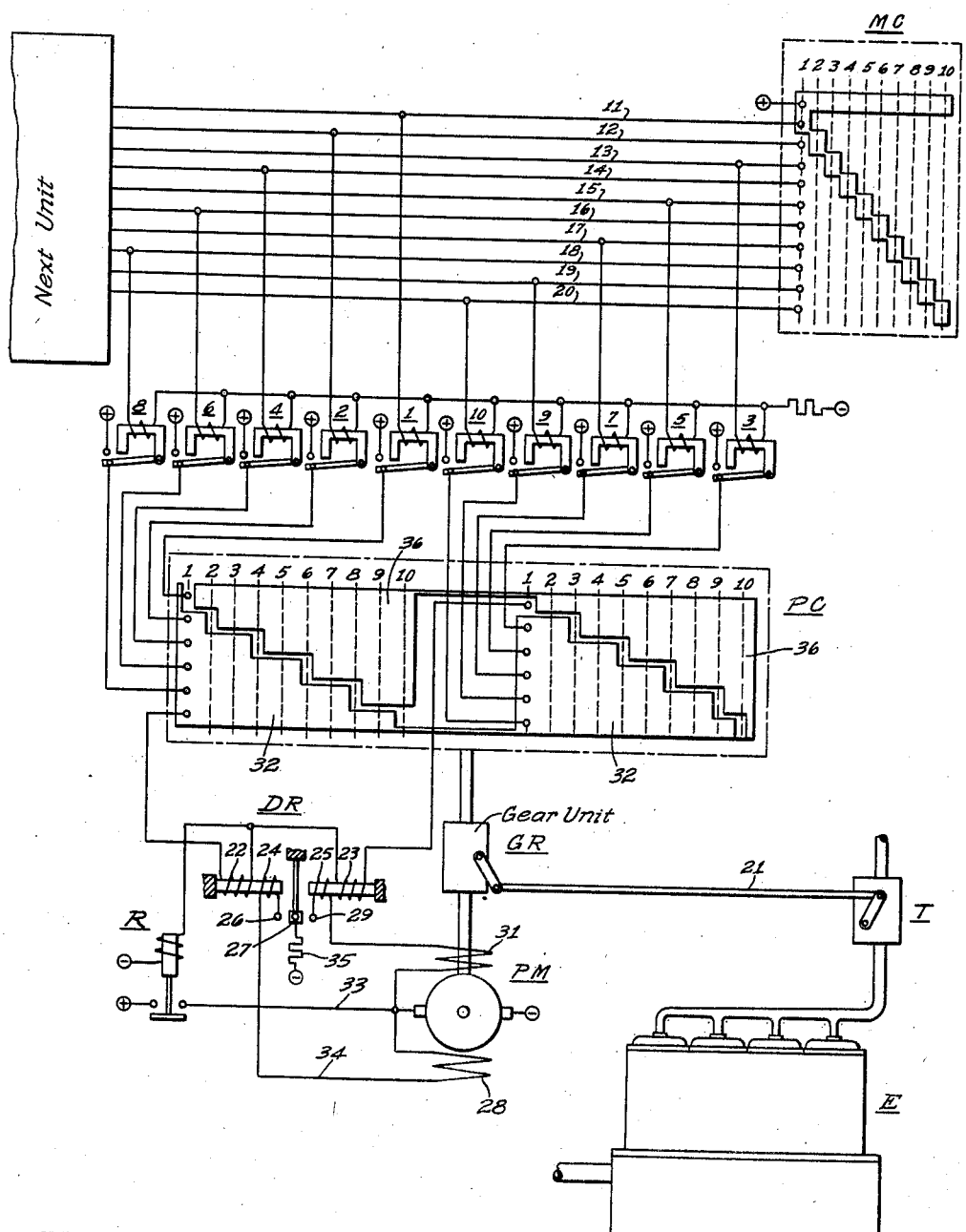
WITNESSES:
INVENTOR
Charles C. Whittaker.
BY
ATTORNEY Patented Jan. 25, 1944

2,340,094

UNITED STATES PATENT OFFICE 2,340,094

CONTROL SYSTEM

Charles C. Whittaker, Pittsburgh, Pa., assignor to Westinghouse Electric & Manufacturing Company, East Pittsburgh, Pa., a corporation of Pennsylvania Application July 17, 1941, Serial No. 402,810

6 Claims. (Cl. 172—239)

My invention relates, generally, to control systems and, more particularly, to systems for controlling the operation of the throttles of internal combustion engines.

In the past, both hydraulic and electropneumatic devices have been utilized for operating the throttles of internal combustion engines which drive the generators on Diesel or gas-electric locomotives. The prior devices have not been entirely satisfactory from the standpoint of size, weight, cost and operation.

An object of my invention, generally stated, is to provide a throttle control system which shall be simple and efficient in operation and which may be economically manufactured and installed.

A more specific object of my invention is to provide a system which progresses smoothly and quickly from one throttle position to another.

Another object of my invention is to provide a throttle control system which is adaptable to operate a number of engines in multiple from one controller whether the engines are all in one cab or in two or more cabs.

A further object of my invention is to provide a system which will operate a throttle in either direction in a step-by-step manner.

Other objects of my invention will be explained fully hereinafter or will be apparent to those skilled in the art.

In accordance with my invention, a throttle operator is driven by a pilot motor through a high reduction gear unit. The pilot motor is controlled by a secondary controller driven by the motor through the gear unit and a plurality of relays, the energization of which is controlled by a master controller which is located remotely from the secondary controller. One master controller may be utilized to control a plurality of pilot motors and engines which are operated in multiple and may be disposed at different locations in a locomotive.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises an internal combustion engine E, which may be utilized for driving a generator (not shown) for a Diesel or gas-electric locomotive; a device T for controlling the supply of fuel to the engine E; a pilot motor PM for operating the device T; a relay R for controlling energization of the pilot motor PM; a relay DR for controlling the direction of rotation of the motor PM, a pilot controller PC, which is driven by the pilot motor PM through a reduction gear unit GR; a manually operable master controller MC and a plurality of relays 1 to 10, inclusive, which are interposed between the master controller MC and the pilot controller PC.

As shown, the master controller MC may be of the drum type having a plurality of contact fingers disposed to engage a contact segment at different selected positions of the controller. The pilot controller PC may also be of the drum type. In order to reduce the size of the pilot controller, two sets of contact fingers are provided, one set being disposed on the drum 180° from the other set.

The device T for controlling the supply of fuel to the engine E is operated by the pilot motor PM through a linkage mechanism 21 which connects the device T to the gear unit GR. It will be understood that the speed of the engine E may be controlled by either operating a throttle valve directly by means of the pilot motor PM and the linkage mechanism 21 or by controlling an engine governor which in turn operates the engine throttle valve.

As shown, the directional relay DR is provided with a pair of operating coils 22 and 23 and a pair of holding coils 24 and 25. When the coil 22 is energized, the contact members 26 and 27 are closed to establish a circuit through a field winding 28 on the pilot motor PM, thereby causing the motor to rotate in a direction to open the throttle device T and increase the engine speed. When the coil 23 is energized, the contact members 27 and 29 of the relay are closed to energize a field winding 31 of the pilot motor to cause the motor to rotate in the opposite direction and close the throttle device T to lower the engine speed. The actuating coil of the relay R is connected in series-circuit relation with whichever of the operating coils of the relay DR is energized, thereby closing the relay R to establish an energizing circuit for the pilot motor PM.

In order to stop the pilot motor PM quickly during rotation in either direction, a dynamic braking circuit is established through the contact members of the relay DR and through one or the other of the holding coils 24 and 25, which hold the contact members of the relay closed after the operating coils are deenergized. In this manner, the dynamic braking circuit is maintained until the motor is stopped, as will be explained more fully hereinafter.

As explained hereinbefore, the present system is suitable for multiple operation of a number of engines, all of which may be controlled from one master controller. Thus one or more additional units, such as illustrated herein, may be controlled from the master controller MC by duplicating the pilot motor PM, the relays DR and R, the pilot controller PC, and the relays 1 to 10 for each throttle device and engine to be controlled. The additional relays 1 to 10 should be connected to train line wires 11 to 20, respectively, in the same maner as the relays shown in the present drawing.

In order that the functioning of the foregoing apparatus may be more clearly understood, the operation of the system will now be described in more detail. Assuming that it is desired to open the throttle device T to increase the engine speed, the master controller MC may be actuated to any position corresponding to the engine speed desired. The operation of the master controller will cause the pilot motor PM to drive the pilot controller PC to a corresponding position and in turn operate the throttle device T to a corresponding position. Thus, if the master controller is actuated to position 5, for example, the train line wire 15 is energized, thereby energizing the relay 5 which closes its contact members. The closing of the relay 5 energizes a segment 32 on the controller PC which in turn energizes the operating coil 22 of the relay DR and the coil of the relay R, thereby closing the contact members 26 and 27 of the relay DR and the contact members of the relay R.

In this manner a circuit is established for the armature winding of the motor PM and the field winding 28. The circuit for the armature winding may be traced from positive through the contact members of the relay R, conductor 33, and the armature winding of the motor PM to negative. The circuit for the field winding 28 extends from the conductor 33 through the field winding 28, conductor 34, the holding coil 24 on the relay DR, the contact members 26 and 27 and a resistor 35 to negative.

Accordingly, the pilot motor PM drives the pilot controller PC through the gear unit GR until the pilot controller reaches position 5, at which position the segment 32 is deenergized, thereby deenergizing the operating coil 22 of the relay DR and the operating coil of the relay R. The deenergization of the relay R opens the power circuit for the motor PM. However, a dynamic braking circuit for the motor is maintained from one terminal of the motor through the field winding 28, the holding winding 24 of the relay DR, the contact members 26 and 27, the resistor 35 and thence through negative to the other terminal of the motor. Thus, the counterelectromotive force of the motor PM causes a current to flow through this dynamic braking circuit and holding the relay DR closed to maintain the circuit until the motor is stopped by the dynamic braking action.

If maximum speed of the engine is desired, the controller MC is actuated to position 10, thereby causing the pilot motor PM to drive the pilot controller PC to position 10 and to operate the throttle device T to the fully open position in the manner hereinbefore described. Likewise, the throttle device may be operated to any desired position, either in a step-by-step manner by operating the controller one step at a time, or by immediately moving the controller to the desired position.

Since the pilot controller PC and the throttle device T are operated through the high reduction gear unit GR, the throttle device is moved slowly from one position to the next regardless of the speed with which the master controller may be operated, thereby causing the engine speed to be increased gradually and avoiding sudden changes in the throttle opening.

If it is desired to decrease the engine speed, the master controller MC is actuated toward the idling position and may be stopped on any intermediate position or returned to the idling position in case it is desired to reduce the speed to the idling speed. Thus, if it is desired to reduce the engine speed by closing the throttle device to a position corresponding to position 4 of the master controller, the master controller is actuated to position 4, thereby energizing the train line wire 14. The energization of the train line wire 14 energizes the relay 4 which is closed to energize a contact segment 36 on the controller PC. The operating coil 23 of the relay DR is energized through the segment 36, thereby closing the contact members 27 and 29 of the relay DR. Since the actuating coil of the relay R is connected in series with the coil 23 of the relay DR, the contact members of the relay R are also closed at this time, thereby establishing the necessary circuits for causing the pilot motor PM to rotate in a direction to close the throttle device T.

The pilot motor continues to drive the pilot controller until it reaches position 4, at which time the contact segment 36 is deenergized, thereby deenergizing the coil 23 of the relay DR and the actuating coil of the relay R. The deenergization of the relay R opens the power circuit for the motor, but a dynamic braking circuit is maintained through the field winding 31 of the pilot motor and the holding coil 25 of the relay DR until the motor is stopped in the manner hereinbefore described.

If it is desired to close the throttle to the idling speed of the engine, the controller MC is actuated to position 1, and the pilot motor drives the pilot controller to the corresponding position, thereby closing the throttle device through the gear unit GR and the linkage mechanism 21.

In this manner, the throttle device T may be operated in either direction to raise or lower the engine speed and may be set at any desired intermediate position. Furthermore, the change in the throttle setting is produced gradually in either direction regardless of the speed with which the master controller may be operated. Thus, it is impossible for the operator of the locomotive to cause improper operation of the engine by sudden changes in the throttle position.

From the foregoing description, it is apparent that the present system is particularly suitable for multiple operation of internal combustion engines where it is necessary that all engines operate at substantially the same speed, since the accurate positioning of all the throttle devices is assured by the present system. Furthermore, the system herein disclosed is simple in structure and operation, since all the apparatus required in the system is of a relatively simple structure and may be installed in a small space.

I do not desire to be restricted to the particular form or arrangement of parts herein shown and described, since it is evident that they may be changed and modified without departing from the spirit and scope of my invention as defined in the appended claims.

I claim as my invention:

1. In a control system, in combination, a pilot motor operable in either direction, a master controller, a pilot controller driven by the pilot motor and cooperating with the master controller to control the pilot motor, a directional relay for controlling the direction of rotation of the pilot motor, and an additional relay energized through the pilot controller for controlling the energization of the pilot motor, said directional relay having a plurality of operating windings selectively energized through the pilot controller and a plurality of holding windings for maintaining a dynamic braking circuit for the pilot motor.

2. In a control system, in combination, a pilot motor operable in either direction, a master controller, a pilot controller driven by the pilot motor and cooperating with the master controller to control the pilot motor, a directional relay for controlling the direction of rotation of the pilot motor, and an additional relay for controlling the energization of the pilot motor, said directional relay having a plurality of operating windings selectively energized through the pilot controller and a plurality of holding windings selectively energized through contact members of the relay to maintain a dynamic braking circuit for the pilot motor.

3. In a control system, in combination, a pilot motor operable in either direction, a master controller, a pilot controller driven by the pilot motor and cooperating with the master controller to control the pilot motor, a directional relay energized through the pilot controller for controlling the direction of rotation of the pilot motor, and an additional relay energized through the pilot controller for controlling the energization of the pilot motor, said directional relay having a plurality of holding windings selectively energized through contact members of the relay to maintain a dynamic braking circuit for the pilot motor.

4. In a control system, in combination, a pilot motor operable in either direction, a master controller, a pilot controller driven by the pilot motor and cooperating with the master controller to control the pilot motor, a directional relay energized through the pilot controller for controlling the direction of rotation of the pilot motor, and an additional relay energized through the pilot controller for controlling the energization of the pilot motor, said directional relay having a plurality of holding windings selectively energized by dynamic braking current of the pilot motor thereby maintaining a dynamic braking circuit for said motor.

5. In a control system, in combination, a pilot motor operable in either direction, a master controller operable to a plurality of different positions, a plurality of relays one of which is energized for each position of the master controller, a pilot controller driven by the pilot motor and cooperating with the master controller and said relays to control the pilot motor, a directional relay energized through the pilot controller for controlling the direction of rotation of the pilot motor, and an additional relay for controlling the energization of the pilot motor, said directional relay having means thereon for maintaining a dynamic braking circuit for the pilot motor.

6. In a control system, in combination, a pilot motor operable in either direction, a master controller operable to a plurality of different positions, a plurality of relays one of which is energized for each position of the master controller, a pilot controller driven by the pilot motor and cooperating with the master controller and said relays to control the pilot motor, a directional relay energized through the pilot controller for controlling the direction of rotation of the pilot motor, and an additional relay energized through the pilot controller for controlling the energization of the pilot motor, said directional relay having means thereon for maintaining a dynamic braking circuit for the pilot motor.

CHARLES C. WHITTAKER.